(12) United States Patent
Lee et al.

(10) Patent No.: US 9,730,555 B1
(45) Date of Patent: Aug. 15, 2017

(54) COLLAPSIBLE CAKE CARRIER

(71) Applicant: Robinson Home Products Inc., Williamsville, NY (US)

(72) Inventors: Stuart Harvey Lee, Forest Hills, NY (US); Jochen Schaepers, New York, NY (US)

(73) Assignee: Robinson Home Products Inc., Williamsville, NY (US)

( * ) Notice: Subject to any disclaimer, the term of this patent is extended or adjusted under 35 U.S.C. 154(b) by 0 days.

(21) Appl. No.: 15/041,920

(22) Filed: Feb. 11, 2016

(51) Int. Cl.
*A47G 19/26* (2006.01)
*A47J 47/14* (2006.01)
*B65D 21/08* (2006.01)
*B65D 43/02* (2006.01)

(52) U.S. Cl.
CPC ............ *A47J 47/14* (2013.01); *B65D 21/086* (2013.01); *B65D 43/02* (2013.01)

(58) Field of Classification Search
CPC ....... A47J 47/14; B65D 21/086; B65D 43/02; A47G 19/26
USPC ............................ 220/6, 8, 9.4, 666; 294/165
See application file for complete search history.

(56) References Cited

U.S. PATENT DOCUMENTS

| | | | |
|---|---|---|---|
| 3,194,460 A * | 7/1965 | Tupper | A45F 5/10 |
| | | | 220/318 |
| 3,981,401 A * | 9/1976 | Blanchard | B65D 43/0222 |
| | | | 206/508 |
| 4,157,103 A | 6/1979 | La Fleur | |
| 4,197,940 A | 4/1980 | DeRossett | |
| 4,375,862 A | 3/1983 | Kurinsky et al. | |
| 4,705,163 A | 11/1987 | James | |
| 5,632,406 A | 5/1997 | Robbins, III | |
| 5,676,252 A | 10/1997 | Lillelund et al. | |
| 5,860,556 A | 1/1999 | Robbins, III | |
| D522,813 S | 6/2006 | Swinford et al. | |
| D582,218 S | 12/2008 | Curtin | |
| D608,592 S | 1/2010 | Curtin et al. | |
| D614,453 S | 4/2010 | Curtin et al. | |
| 8,056,751 B2 | 11/2011 | Vovan | |
| 8,186,533 B1 * | 5/2012 | Tseng | A47G 19/26 |
| | | | 220/203.04 |
| 8,720,689 B2 | 5/2014 | Kirkland et al. | |
| 8,844,764 B2 * | 9/2014 | Curtin | B65D 43/0206 |
| | | | 220/23.86 |
| 2006/0266754 A1 * | 11/2006 | Carmona | B65D 21/086 |
| | | | 220/666 |
| 2007/0007291 A1 | 1/2007 | Gunn | |
| 2010/0200583 A1 * | 8/2010 | Curtin | B65D 43/0206 |
| | | | 220/4.27 |
| 2013/0313257 A1 | 11/2013 | Gartz et al. | |
| 2014/0299607 A1 * | 10/2014 | Starr | A47J 47/00 |
| | | | 220/574 |

(Continued)

*Primary Examiner* — King M Chu
(74) *Attorney, Agent, or Firm* — Florek & Endres PLLC

(57) ABSTRACT

A cake carrier having a base and a cover, the cover having a substantially rigid top portion and a substantially rigid bottom portion joined by a flexible middle portion having at least one living hinge to collapse the cake carrier from an open configuration to a collapsed configuration, and the base comprising a frame that holds a reversible insert that has a first surface including a plurality of wells and a second surface that is substantially flat. The cake carrier has a handle formed of straps attached to the frame that may be joined above the cover for carrying the cake carrier.

14 Claims, 3 Drawing Sheets

(56) References Cited

U.S. PATENT DOCUMENTS

2014/0305935 A1* 10/2014 DeCraim ............... B65D 1/40
                                                  220/4.03
2014/0360909 A1* 12/2014 Curtin ............... B65D 43/0206
                                                  206/562

* cited by examiner

COLLAPSIBLE CAKE CARRIER

FIELD OF THE INVENTION

The present invention relates to food containers, and more particularly to a collapsible cake carrier for storing and carrying baked goods such as cakes, cupcakes, muffins, pies, cookies, brownies and the like.

BACKGROUND OF THE INVENTION

Baked goods are often stored and transported in cake carriers, which generally employ a base for holding the baked goods and a cover or dome that cooperates with the base to cover the baked goods. The covered base acts to prevent damage or contamination to the baked goods as well as maintain freshness of the baked goods during transport.

Because the size of the cover needs to be relatively large in order to accommodate baked goods of various sizes, cake carriers are often bulky and take up significant space in storage. One attempt to make cake carriers less bulky in storage has been to make the cover collapsible. For example, U.S. Pat. No. 8,844,764 describes a cake carrier that employs either a tray for cakes or a tray for cupcakes and a collapsible cover whereby the cover includes locks that secure the cover to a groove on the tray.

Notwithstanding, there is a need for an improved collapsible cake carrier that can accommodate a cake or a number of cupcakes without requiring different trays for cakes and cupcakes, while still permitting the cake carrier to collapse into a compact size for storage. There is also a need for an improved handle system for carrying the cake carrier during transportation, which can also be used to maintain the collapsed cake carrier in its collapsed configuration when the collapsed cake carrier is being stored.

SUMMARY OF THE INVENTION

The present invention is directed to a cake carrier having a base and a cover, the cover comprising a substantially rigid top portion and a substantially rigid bottom portion with a flexible middle portion intermediate the top portion and the bottom portion, the middle portion having at least one living hinge to collapse the cake carrier from an open configuration to a collapsed configuration, and the base comprising a frame for retaining a reversible insert, the reversible insert comprising a first surface including a plurality of wells and a second surface that is substantially flat.

The reversible insert acts as the bottom surface of the cake carrier, which may be removed entirely from the frame and used as a server for the baked goods. The first and second sides of the reversible insert allows the cake carrier to be adapted to hold different types of baked goods, thereby improving versatility. For example, when used for carrying a cake, the reversible insert may be positioned with the flat second surface facing upwardly, with the cake resting on the flat surface. Alternatively, when used for carrying cupcakes or muffins, the reversible insert may be positioned with the first surface including wells facing upwardly, with a cupcake or muffin in each of the wells.

The preferred cake carrier also preferably comprises a tray that is fashioned to be held a fixed distance above the upper surface of the reversible insert by one or more legs. In the most preferred embodiment, each of a plurality of legs engage a leg socket in the reversible insert and a leg socket in the tray to hold the tray a fixed distance above the reversible insert. The use of the tray, held a fixed distance above the upper surface of the reversible insert, acts to increase the capacity of the cake carrier where baked goods can be placed on both the upper surface of the reversible insert and the upper surface of the tray.

In the most preferred embodiment, the tray has a first surface including a plurality of wells that can each hold one cupcake, muffin or the like, and a second surface comprising a flat surface opposite the first surface, for holding a pie, cookies or the like. The tray may be added to the cake carrier by inserting the legs into the leg sockets, which may be located on both the first and/or second surface of the reversible insert and on the first and/or second surface of the tray, thereby joining the reversible insert and tray in a tiered relationship. When leg sockets are included on both surfaces of both the reversible insert and the tray, the cake carrier is most versatile, capable of holding different types of baked goods on each, i.e., cupcakes on the first surface of the reversible insert and cookies on the second surface of the tray, a pie on the second surface of the reversible insert and muffins on the first surface of the tray, etc.

It is preferred that the frame include connectors for connecting two strap members to the frame. The strap members are adapted to be joined above the cover when the cover of the cake carrier is in an open configuration, to serve as a handle for the cake carrier. The two strap members may be held together to act as a handle, and are preferably joined by a harness that is affixed to one of the strap members and is capable of fastening into a loop that encircles the other strap member. It is also preferred that the two strap members each include at least one of a pair of cooperating members that are positioned on their respective straps so that they may be joined together above the cover when the cake carrier is in a collapsed configuration, maintaining the collapsed cover on the removable insert when the cake carrier is collapsed for storage.

The term "baked goods" is not intended to limit the scope of the invention to food items that are baked. Rather, the cake carrier described herein can be used for storing and carrying any number of items of appropriate size and shape. However, in a preferred embodiment, the cake carrier is used for baked goods such as cakes, cupcakes, muffins, pies, cookies, brownies, pastries, doughnuts and the like.

BRIEF DESCRIPTION OF THE DRAWINGS

The attached drawings are intended to better illustrate a preferred embodiment of the present invention without limiting the invention in any manner whatsoever.

DETAILED DESCRIPTION OF THE PREFERRED EMBODIMENTS

The following description of preferred embodiments is presented to describe the present invention and is not to be construed to limit the scope of the claims in any manner whatsoever.

Figure 3:
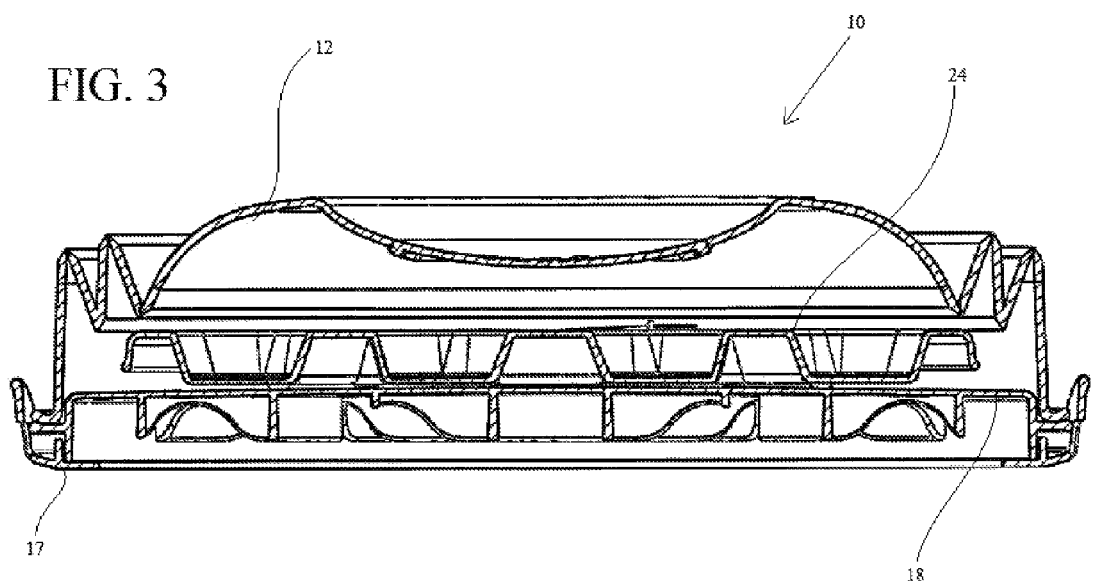
FIG. 3 is a cross sectional view of the preferred embodiment of the cake carrier of the present invention in its collapsed configuration, without handle straps.

The preferred embodiment of the present invention is directed to a cake carrier 10 having a base 11 and a collapsible cover 12. The cover 12 includes a substantially rigid top portion 13 and a substantially rigid bottom portion 15 joined by a flexible middle portion 14 having at least two living hinges 16 to collapse the cake carrier 10 from an open configuration (shown in FIG. 1) to a collapsed configuration (shown in FIG. 3). The base 11 comprises a frame 17 that holds a reversible insert 18 having a first surface comprising a plurality of wells 19, for holding cupcakes, muffins or the like, and a second surface that is substantially flat.

The cake carrier 10 of the present invention is preferably round, although it is contemplated that the cake carrier 10 may also be rectangular, elliptical or of another suitable shape.

The middle portion 14 of the cake carrier 10 may be formed of any suitable flexible material that is safe for use with food preparation, such as a thermoplastic elastomeric material. A most preferred material for the middle portion 14 is a silicone-based thermoplastic elastomeric material. The top portion 13 and bottom portion 15 of the cake carrier 10 may be composed of any suitable substantially rigid material which is safe for use with food preparation, such as glass, stainless steel, aluminum and/or plastic. A preferred material for the top portion 13 and bottom portion 15 is plastic, and most preferably acrylonitrile butadiene styrene (ABS) or polypropylene.

The top portion 13, bottom portion 15 and middle portion 14 each have an upper edge, a lower edge and respective diameters. The diameters of the top portion 13, middle portion 14, and bottom portion 15 may be respectfully sizes so that when joined together the resultant cover 12 in its open configuration preferably resembles a frustum of a cone. The diminishing diameters from bottom to top further permit the outer diameter of the top portion 13 to fit within the inner diameter of the bottom portion 15, with the folded middle portion 14 there between, when the cake carrier 10 is in its collapsed configuration.

The upper edge of the middle portion 14 is affixed to the lower edge of the top portion 13 and the lower edge of the middle portion 14 is affixed to the upper edge of the bottom portion 15 by any suitable means known in the art, including, but not limited to, molding or adhering the top portion 13, bottom portion 15 and middle portion 14 to one another.

The use of at least two living hinges 16 allows the cover 12 to be collapsed for storage by applying inward force simultaneously to the top portion 13 and bottom portion 15, or by applying downward force to the top portion 13 while the cake carrier 10 or cover 12 is sitting on a flat surface. Once in a collapsed configuration, the cover 12 can be expanded to its useful or open configuration by applying outward force simultaneously to the top portion 13 and bottom portion 15.

In a preferred embodiment of the present invention, the middle portion 14 of the cover 12 comprises two living hinges 16, which enable the cover 12 to be collapsed into three substantially concentric sections.

In a preferred embodiment, the cake carrier 10 of the present invention includes a tray 24 that is positioned above the reversible insert 18. The tray 24 preferably has a first surface including a plurality of wells 25 and a second surface opposite the first surface that is substantially flat. The tray 24 may be connected to the reversible insert 18 by one or more legs 26. A preferred embodiment employs 3 or 4 legs 26, most preferably 3. To mount the tray 24 above the reversible insert 18, each leg 26 has two ends with one end inserted into a socket 27 located on the second surface of the tray 24 and the other end inserted into a corresponding socket 27 located on the first surface of the reversible insert 18 thereby joining the reversible insert 18 and tray 24 in a tiered relationship.

The sockets 27 are preferably spaced evenly about the periphery of the tray 24 and reversible insert 18.

Most preferably, both the first and second surfaces of each of the reversible insert 18 and tray 24 have leg sockets 27 so that the upward facing surface of each of the reversible insert 18 and tray 24 can be used without regard to the upward facing surface of the other.

When use of the tray 24 is not desired, the legs 26 may be removed from the sockets 27 and the tray 24 and legs 26 may be set aside. When the cake carrier 10 is collapsed for storage, the tray 24 and legs 26 may be placed on top of the reversible insert 18 and the cover 12 collapsed into the collapsed configuration for storage. In an alternative embodiment, one end of one or more of the legs 26 are permanently affixed to the reversible insert 18 or the tray 24, but are adapted to pivot inward to the adjacent surface for storage, so that when extended the other end of the legs 26 may be inserted into leg sockets 27 located on the other of the reversible insert 18 or tray 24. The cake carrier 10 of the present invention may also employ one or more additional trays 24 that are stacked in the manner described above, depending on the dimensions of the cake carrier 10.

The wells 19 of the reversible insert 18 and the wells 25 of the tray 24 may be recessed into their respective surfaces or may project upwardly from their respective surfaces. In an embodiment, the wells 19 of the reversible insert 18 project from the first surface of the reversible insert 18 and the wells 25 of the tray 24 are recessed into the first surface of the tray 24. This configuration allows the second surface of the reversible insert 18 to be flat while the second surface of the tray 24 reflects the negative of the first surface of the tray 24. Alternatively, the wells 19, 25 may project upwardly from their respective surfaces, so that the second surface of each of the reversible insert 18 and tray 24 are flat.

The wells 19, 25 are preferably sized and shaped to hold a standard cupcake. In general, the wells 19, 25 may have a circular lower portion that supports the bottom of the baked good and a circular opening above the lower portion with a larger diameter than the lower portion. The circular opening preferably includes a pair of opposing engagement recesses that allow a baked good within a well to be gripped for removal. In embodiments employing projected wells, the engagement recesses may be formed in the side walls of the well. In embodiments employing recessed wells, the engagement recesses may be also be recessed into the surface adjacent the opening of the well by a proportion of the depth of the well, preferably about ¼, ⅓, ½, ⅔ or ¾, or equal in depth to the well 19, 25.

In a preferred embodiment, the wells 19, 25 are recessed on the first surface of the reversible insert 18 and/or tray 24 such that two or more wells 19, 25 are connected by an opening thereby defining a continuous recess encompassing the at least two wells 19, 25. In a particularly preferred embodiment, the wells 25 of the reversible insert 18 and/or tray 24 are positioned in two concentric rings whereby the outer concentric ring encompasses a series of wells 19, 25 that are interconnected by an opening thereby defining a continuous circular recess and the inner concentric ring also encompasses a series of wells 19, 25 that are interconnected by an opening thereby defining a continuous circular recess.

The frame 17 of the cake carrier is used to support the reversible insert 18 with either the first surface or second surface facing upwardly. To this end, the frame 17 preferably takes the shape of an opening that is bounded by a substantially rigid support, preferably including a rim 29 adjacent the opening that is bounded by a side wall. The reversible insert 18 is supported in the frame 17 by a lip 20 that rests on top of the rim 29.

The cover 12 is placed on top of the lip 20 so that the lip 20 of the reversible insert 18 is sandwiched between the rim 29 of the frame 17 and the cover 12. The cover 12 preferably includes a lip 30 extending from the bottom edge of the bottom portion 15 that locks under a projection 31 extending from the frame 17 above the rim 29 thereby retaining the cover 12 on the frame 17. In an embodiment of the present invention, corresponding locking members located on the cover 12 and on the frame 17 may also be employed to further retain the cover 12 on the frame 17. In one such embodiment, the cover 12 includes a lock pivotally mounted on the cover 12 that engages with a peripheral flange located on the frame 17 or vice versa.

In the preferred embodiment shown, the frame 17 of the cake carrier 10 also includes a first strap member 21a and a second strap member 21b, although it should be understood that any number of straps may be used. For instance, a single strap that crosses over the cover from opposing sides of the frame could be employed, however, two straps are preferred. The strap members 21a, 21b are preferably made from a strong woven material, such as woven nylon, solid nylon strap material, or any suitable strap material, and may contain an elastic element.

The first strap member 21a and the second strap member 21b are configured to be releasably joined above the cover 12 when the cake carrier 10 is in an open configuration. The strap members 21a, 21b may be joined by a pair of cooperating members with one of the cooperating members on the first strap member 21a and the corresponding cooperating member on the second strap member 21b. The cooperating members may be any suitable type, including hooks, snaps, clasps, clips, buttons or the like. In a more preferred embodiment, a harness 22 is affixed to the first strap member 21a and is capable of fastening into a loop that encircles the second strap member 21b thereby securing the strap members 21a, 21b to each other. The harness 22 also serves as a handle making it more comfortable to carry the cake carrier 10.

Preferably, the first strap member 21a is attached to the frame 17 at two points that are separated by a distance that is approximately one quarter the length of the entire perimeter of the frame 17. Similarly, the second strap member 21b is also preferably attached to the frame 17 at two points that are separated by a distance that is approximately one quarter the length of the entire perimeter of the frame 17. Stated differently, one point of connection of the first strap member 21a would be approximately opposite one point of connection of the second strap member 21b, and the other point of connection of the first strap member 21a would be approximately opposite the other point of connection of the second strap member 21b. For example, in an embodiment where the frame 17 is circular, the first strap member 21a would be connected to the frame 17 at the 0° position and the 90° position and the second strap member 21b would be connected to the frame 17 at the 180° position and the 270° position.

The strap members 21a, 21b are preferably attached to the frame 17 by looping their free ends through apertures 28 in the frame 17 and then securing the free end back to the strap member by stitching, adhesive, hook and loop fasteners, snaps, clips, clasps or the like. The strap members 21a, 21b may also be attached to the frame 17 directly, for example, by adhesive, hooks, snaps, clasps, clips, buttons or the like.

Figure 1:
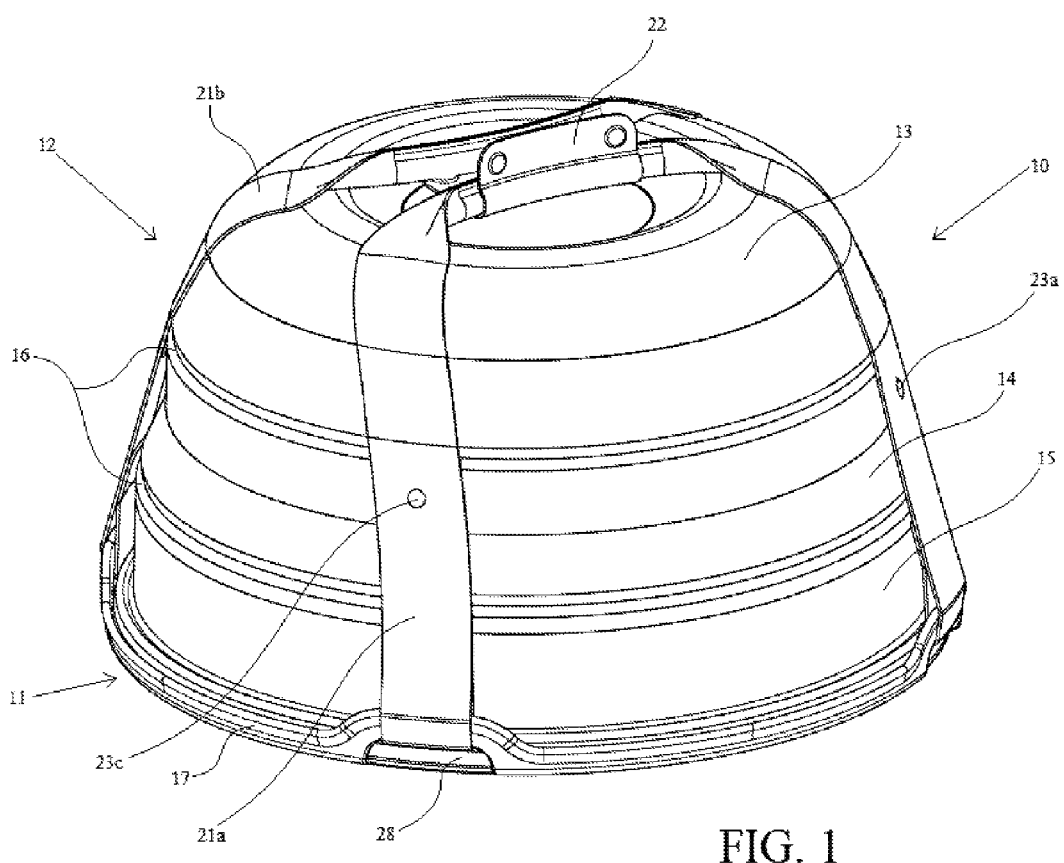
FIG. 1 is a perspective view of the preferred embodiment of the cake carrier of the present invention.

In use, the strap members 21a, 21b are of a defined length so that when attached they hold the cover 12 on the reversible insert 18. When the strap members 21a, 21b are detached from one another the cover 12 can be removed from the base 11. Once the desired baked goods are placed in the cake carrier 10, the cover 12 is placed on the base 11 and the strap members 21a, 21b are joined above the cover 12 to hold the cover 12 on the base 11, such that the cake carrier 10 may be carried or otherwise transported. The joined strap members 21a, 21b also provide a handle for carrying the cake carrier so that the upward force exerted by the handle is applied to the base 11 rather than the cover 12 thereby preventing the cover 12 from being pulled off of the base 11 during transit. A depression in the middle of the top portion 13 of the cover 12 provides room for the user to access the handle, as shown in FIG. 1.

Figure 2:
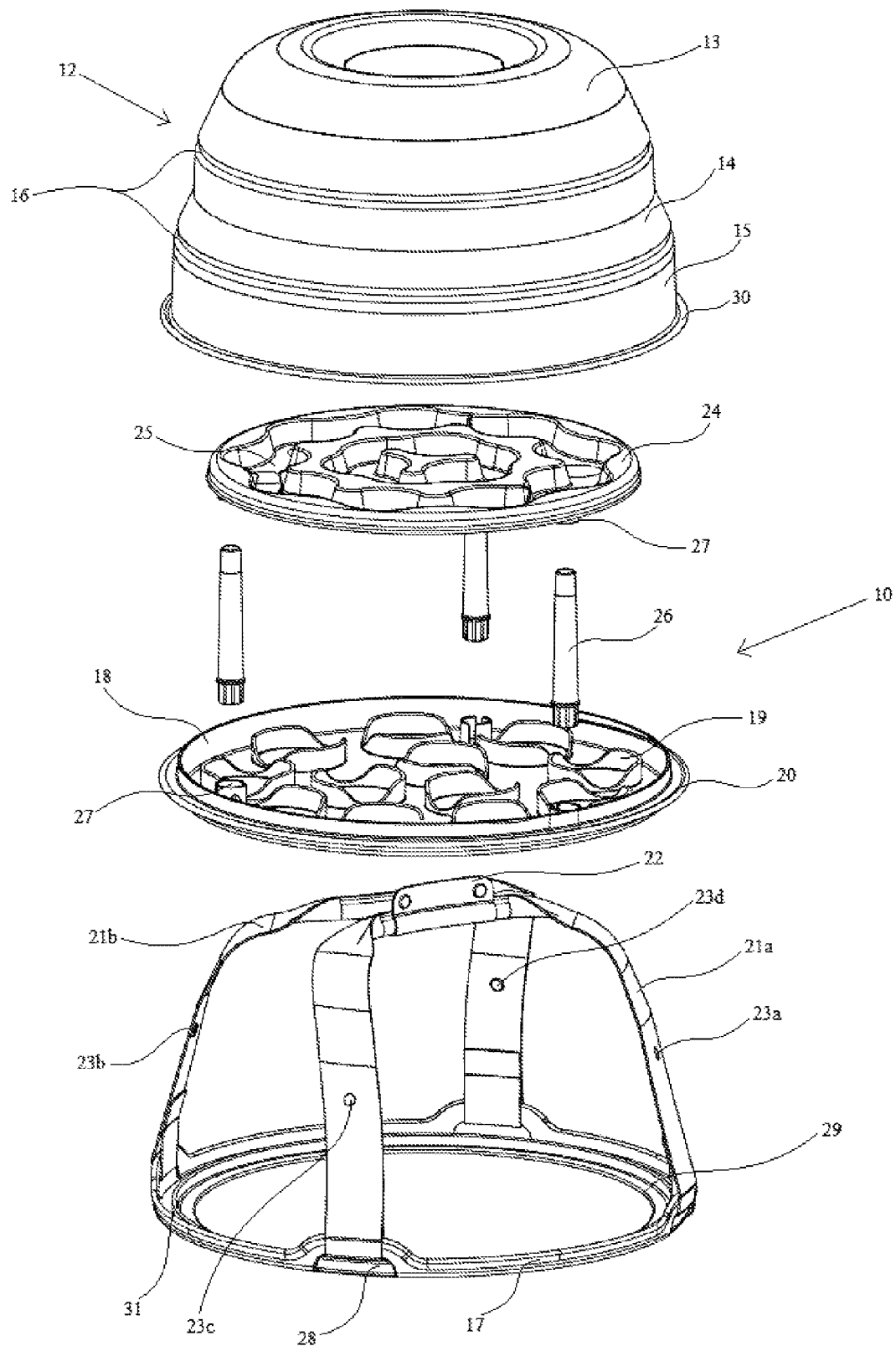
FIG. 2 is an exploded view of the preferred embodiment of the cake carrier of the present invention.

In a preferred embodiment, the strap members 21a, 21b each include at least one of a pair of cooperating members 23a, 23b that are positioned on their respective strap members 21a, 21b so that they may be joined together above the cover 12 when the cake carrier is in a collapsed configuration. As shown in FIG. 2, a second pair of cooperating members 23c, 23d may also be employed.

As discussed above, it is preferred that one point of connection of the first strap member 21a would be approximately opposite one point of connection of the second strap member 21b, and the other point of connection of the first strap member 21a would be approximately opposite the other point of connection of the second strap member 21b. In this embodiment, the pairs of cooperating members 23a, 23b and 23c, 23d are located on the strap members 21a, 21b that have opposing points of connection on the frame 17. The cooperating members 23a, 23b and 23c, 23d may be any suitable type, including hooks, snaps, clasps, clips, buttons, hook and loop fasteners or the like, and are preferably snaps.

Variations, modifications and alterations to the above detailed description will be apparent to those skilled in the art. All such variations, modifications and/or alternatives are intended to fall within the scope of the present invention, limited only by the claims. All cited patents and publications are hereby incorporated in their entirety by reference.

The invention claimed is:

1. A cake carrier comprising a base and a cover, the cover comprising a substantially rigid top portion and a substantially rigid bottom portion joined by a flexible middle portion having at least two living hinges to collapse the cake carrier from an expanded configuration to a collapsed configuration, and the base comprising a frame and a reversible insert that is received in the frame, wherein the reversible insert comprises a first surface comprising a plurality of wells and a second surface that is substantially planar, wherein the underside of the bottom of each well of the plurality of wells is flush with the substantially planar second surface.

2. The cake carrier of claim 1 wherein the flexible middle portion is formed of a silicone based elastomeric material.

3. The cake carrier of claim 1 wherein the frame further comprises a first strap member.

4. The cake carrier of claim 3 wherein the frame further comprises a second strap member, wherein the first strap member and second strap member are configured to be joined above the cover when the cake carrier is in an open configuration.

5. The cake carrier of claim 1 wherein the reversible insert further comprises a lip that holds the reversible insert between the frame and the cover.

6. The cake carrier of claim 1 further comprising a tray that is positioned above the reversible insert and is removably connected to the reversible insert by one or more legs.

7. The cake carrier of claim 6 wherein the tray comprises a first surface having a plurality of wells and a second surface opposite the first surface.

8. The cake carrier of claim 1 wherein the plurality of wells project from the first surface of the insert.

9. The cake carrier of claim 7 wherein the plurality of wells project from the first surface of the tray or are recessed into the first surface of the tray.

10. The cake carrier of claim 1 wherein at least two wells are connected by an opening thereby defining a continuous recess encompassing the at least two wells.

11. The cake carrier of claim 4 wherein the first strap member comprises a first cooperating member and the second strap member comprises a second cooperating member wherein the first and second cooperating members are positioned on the strap members to engage above the cover when the cake carrier is in a collapsed configuration.

12. A cake carrier comprising a base and a cover; wherein the cover comprises a substantially rigid top portion and a substantially rigid bottom portion and wherein the top portion and the bottom portion are joined by a flexible middle portion having at least two living hinges to collapse the cake carrier from an open configuration to a collapsed configuration; wherein the base comprises a frame and a reversible insert that is held in the frame, the reversible insert comprising a first surface having a plurality of wells and a second surface having a substantially planar surface, wherein an underside of the bottom of each well of the plurality of wells is flush with the substantially planar second surface, and wherein the frame comprises a first strap member and a second strap member that are configured to be joined above the cover when the cake carrier is in an expanded configuration.

13. The cake carrier of claim 12 wherein the flexible middle portion is formed of a silicone based elastomeric material.

14. The cake carrier of claim 12 wherein the first strap member comprises a first cooperating member and the second strap member comprises a second cooperating member wherein the first and second cooperating members are positioned to engage when the cake carrier is in a collapsed configuration.

* * * * *